E. Matteson.
Buoyant Propeller.
N°. 82,968. Patented Oct. 13, 1868.
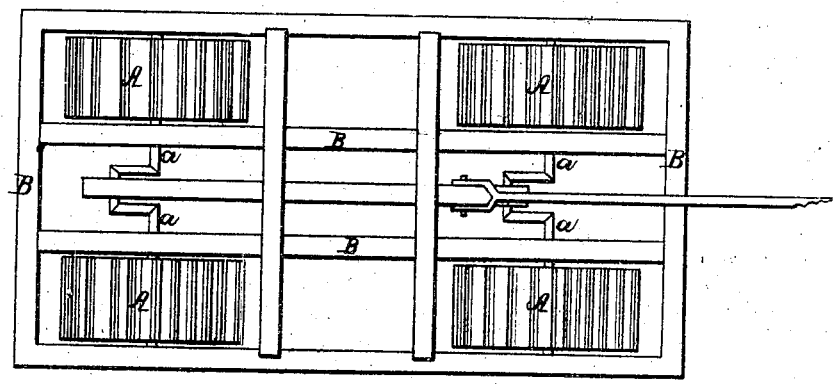
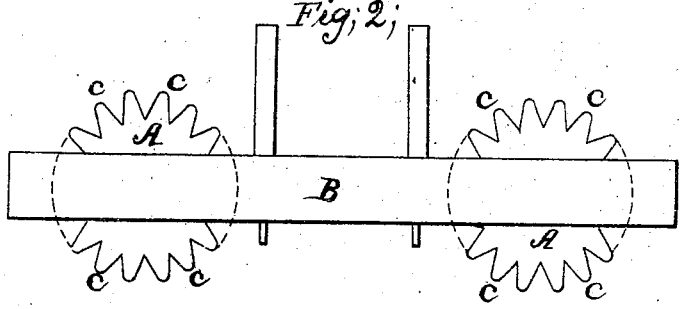
Witnesses:
Leopold Everh
A. A. Yeatman
Inventor:
Elisha Matteson
per
Alexander F. Mason
Atty.

Sheet 2. 2 Sheets.
E. Matteson.
Buoyant Propeller.
Nº 82,968.     Patented Oct. 13, 1868.
Fig. 3;
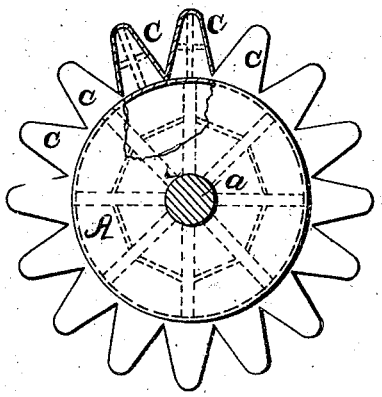
Witnesses;
C. S. Ford
H. Yeatman
Inventor;
Elisha Matteson
per
Alexander & Mason
Attys.

United States Patent Office.

ELISHA MATTESON, OF BROOKLYN, NEW YORK, ASSIGNOR TO HIMSELF AND JAMES M. TRIPPE.

Letters Patent No. 82,968, dated October 13, 1868.

IMPROVEMENT IN BUOYANT PROPELLERS.

The Schedule referred to in these Letters Patent and making part of the same.

*To all whom it may concern:*

Be it known that I, ELISHA MATTESON, of Brooklyn, in the county of Kings, and State of New York, have invented certain new and useful Improvements in "Method for Locomotion on Water;" and do hereby declare that the following is a full, clear, and exact description thereof, reference being had to the accompanying drawings, and the letters of reference thereon, making a part of this specification.

Figure 1 represents a plan view of my device;

Figure 2, a side view; and

Figure 3, a side view of one of the propelling-wheels, with broken lines, showing its construction.

In the accompanying drawings, A represents the wheels, which are arranged in pairs in a suitable frame, B. These wheels are supported upon suitable cross-shafts, a, in said frame, which said shafts form a crank between each opposite wheel, as shown in fig. 1.

Each of the wheels A is made of metal, substantially as follows: I first form an air-tight cylinder, of suitable size, and arrange a series of V-shaped buckets or paddles, C, on the outer periphery of the said cylinder. These V-shaped buckets are also air-tight, and are independent of each other. The cylinder itself, as well as the buckets, is suitably braced on the inner side, as shown in fig. 3. Should one of the buckets become broken off, it will readily be seen that no water can penetrate the other buckets or the cylinder A. These buckets and the cylinder may be filled with gas or cork, as preferred.

The wheels A being placed in pairs, as shown in fig. 1, a connecting-rod is used upon the two (or more) crank-shafts, and the pitman connected thereto.

Any suitable kind of vessel may be added to the frame B and the air-tight wheels.

The peculiar construction of these wheels buoys the vessel, and, when steam-power is applied to the pitman, causes the wheels to revolve with such rapidity as to propel the vessel forward at a very great rate of speed.

I am aware that an air-tight wheel, with V-shaped buckets, formed with said wheel, is not new, nor their application to a marine locomotive.

What I claim, and desire to secure by Letters Patent, is—

The cylinder A, air-tight, and provided with independent air-tight V-shaped buckets, C, arranged on the exterior of said cylinder, and within a suitable frame, B, to operate substantially as set forth.

In testimony that I claim the foregoing, I have hereunto set my hand, this 7th day of August, 1868.

ELISHA MATTESON.

Witnesses:
LEOPOLD EVERT,
EDM. F. BROWN.